(12) United States Patent
Coutandin et al.

(10) Patent No.: US 9,790,810 B2
(45) Date of Patent: Oct. 17, 2017

(54) STATOR CASING COOLING SYSTEM

(71) Applicant: GE AVIO S.R.L, Rivalta di Torino (IT)

(72) Inventors: Daniele Coutandin, Avigliana (IT); Stefano Zecchi, La Loggia (IT)

(73) Assignee: GE AVIO S.R.L., Rivalta di Torino (IT)

( * ) Notice: Subject to any disclaimer, the term of this patent is extended or adjusted under 35 U.S.C. 154(b) by 485 days.

(21) Appl. No.: 14/407,918

(22) PCT Filed: Jun. 14, 2013

(86) PCT No.: PCT/IB2013/054893
§ 371 (c)(1),
(2) Date: Dec. 12, 2014

(87) PCT Pub. No.: WO2013/186757
PCT Pub. Date: Dec. 19, 2013

(65) Prior Publication Data
US 2015/0152745 A1    Jun. 4, 2015

(30) Foreign Application Priority Data

Jun. 14, 2012  (IT) .............................. TO2012A0519

(51) Int. Cl.
*F01D 25/12* (2006.01)
*F01D 11/24* (2006.01)
(Continued)

(52) U.S. Cl.
CPC .............. *F01D 25/12* (2013.01); *F01D 11/24* (2013.01); *F01D 25/145* (2013.01); *F02C 7/18* (2013.01); *F05D 2220/32* (2013.01); *F05D 2250/712* (2013.01); *F05D 2260/201* (2013.01); *F05D 2260/231* (2013.01)

(58) Field of Classification Search
CPC ........ F01D 11/24; F01D 25/12; F01D 25/145; F05D 2260/201; F05D 2260/231
See application file for complete search history.

(56) References Cited

U.S. PATENT DOCUMENTS 6,149,074 A * 11/2000 Friedel .................... F01D 11/24
                                                                    165/169
7,070,387 B2 * 7/2006 Crozet .................... F01D 11/24
                                                                    415/173.1
(Continued)

FOREIGN PATENT DOCUMENTS

EP         0 892 153 A1    1/1999
EP         1 205 637 A1    5/2002
(Continued)

*Primary Examiner* — Ninh H Nguyen
(74) *Attorney, Agent, or Firm* — Maschoff Brennan

(57) ABSTRACT

In a gas turbine for aeronautic engines, a stator body delimited by an outer lateral surface is cooled by an air cooling device having a plurality of circumferential tubes for distributing air on the outer lateral surface; each circumferential tube having a plurality of outlets for guiding respective cooling airflows towards the outer lateral surface and into a respective circumferential channel obtained between two groups of circumferential channels adjacent to each other and lapped by the flow of air leaving the circumferential channel.

21 Claims, 4 Drawing Sheets

(51) Int. Cl.
*F02C 7/18* (2006.01)
*F01D 25/14* (2006.01)

(56) References Cited

U.S. PATENT DOCUMENTS

| | | | | |
|---|---|---|---|---|
| 8,092,146 | B2 * | 1/2012 | Legare | F01D 11/24 415/1 |
| 8,414,255 | B2 * | 4/2013 | Ireland | F01D 5/186 415/116 |
| 2005/0129499 | A1 | 6/2005 | Morris et al. | |

FOREIGN PATENT DOCUMENTS

| | | |
|---|---|---|
| EP | 1 798 382 A2 | 6/2007 |
| EP | 2 236 772 A2 | 10/2010 |

\* cited by examiner

STATOR CASING COOLING SYSTEM

TECHNICAL FIELD

The present invention relates to a gas turbine for aeronautic engines.

BACKGROUND ART

As is known, a gas turbine for aeronautic engines comprises a stator part having a body or outer casing and a rotor part arranged inside and connected to the stator part.

In order to control the deformation that arises due to the effect of the heat load and consequently optimize the clearance between the stator part and the rotor part as the operating temperature changes, it is known to cool the outer casing by directing jets of cold air onto the outer lateral surface of the casing, which usually has a smooth surface. By varying the airflow and directing the air in specific zones, it is possible to control the deformation of the various parts in relative motion.

In currently known solutions, cooling devices are used in which the air is distributed using a tube grid that surrounds the outer casing and comprises a plurality of outer longitudinal air-supply tubes and a plurality of inner circumferential air-distribution tubes. The distribution tubes receive cooling air from the longitudinal tubes and are provided with air outlet openings, which face towards the outer lateral surface and are set apart from each other in a circumferential direction to distribute the air along the entire outer circumferential periphery of the casing.

In order to optimize the impact of the air on the various parts of the casing's outer lateral surface, the above-mentioned outlet openings are sized so as to obtain a desired airflow and the circumferential tubes are placed at a predetermined distance from the outer lateral surface, normally in the order of a few millimeters.

Known cooling devices of the above-defined type, even if universally used, are relatively heavy as the tubes used, in particular those for air distribution, must necessarily be made of steel in order to support the high heat loads due to the close proximity of the circumferential tubes to the outer lateral surface of the casing.

In addition, beyond certain values, the known devices do not allow reducing the airflow for the same level of cooling efficiency or increasing the cooling for the same level of airflow.

Gas turbines equipped with air cooling devices in which the inner circumferential tubes for air distribution are arranged inside outer channels made in the stator part of the turbine are described in patent documents EP 0892 153 A1, US 2005/129499 A1, EP 1 798 382 A2, EP 1 205 637 A1 and EP 2 236 772 A2;

DISCLOSURE OF INVENTION

The object of the present invention is to provide a gas turbine for aeronautic engines, the characteristics of embodiment of which enable the above-described problems to be resolved in a simple and inexpensive manner.

According to the present invention, a gas turbine for aeronautic engines is provided as claimed in claim 1.

BRIEF DESCRIPTION OF THE DRAWINGS

The invention will now be described with reference to the attached drawings which show a non-limitative example of embodiment thereof, where.

BEST MODE FOR CARRYING OUT THE INVENTION

Figure 1:
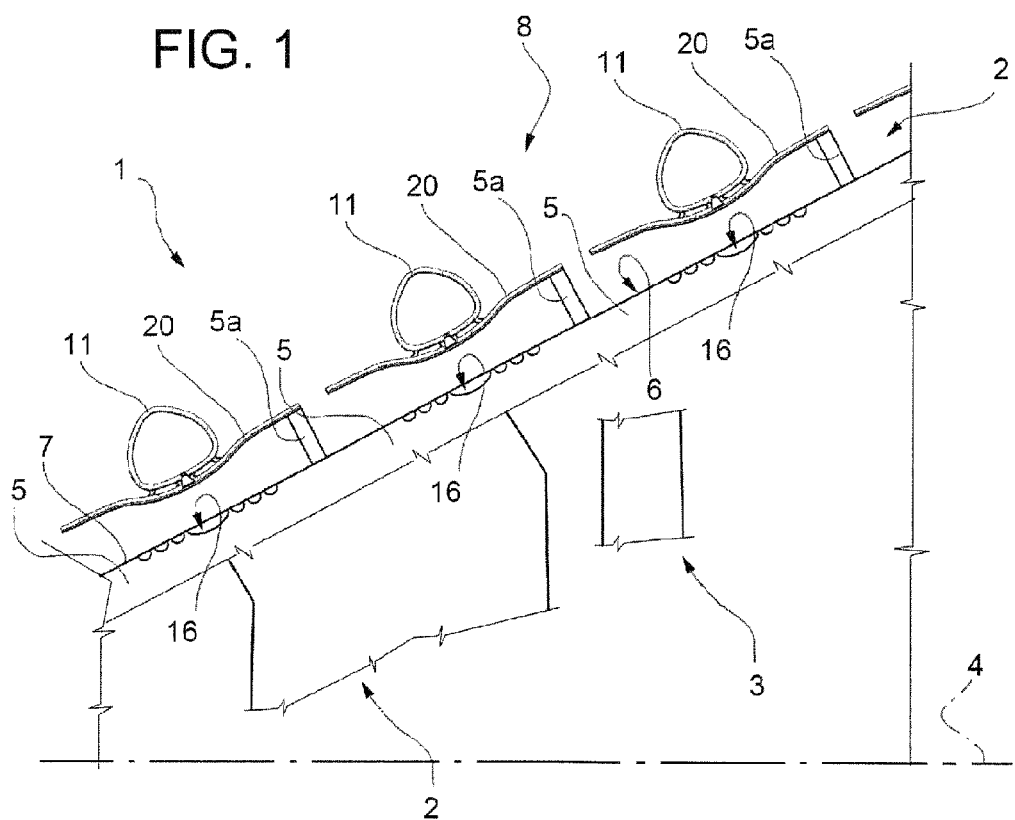
FIG. 1 shows, schematically and substantially in block form and in section with parts removed for clarity, a preferred embodiment of a gas turbine for aeronautic engines provided according to the principles of the present invention.

In FIG. 1, a gas turbine for aeronautic engines is indicated, as a whole, by reference numeral 1. The turbine 1 comprises a hollow outer stator body, indicated as a whole by reference numeral 2, an inner rotor body 3 rotating about a turbine axis 4 and a seal, in itself known and not described in detail, arranged between the stator body 2 and the rotor body 3.

Figure 3:
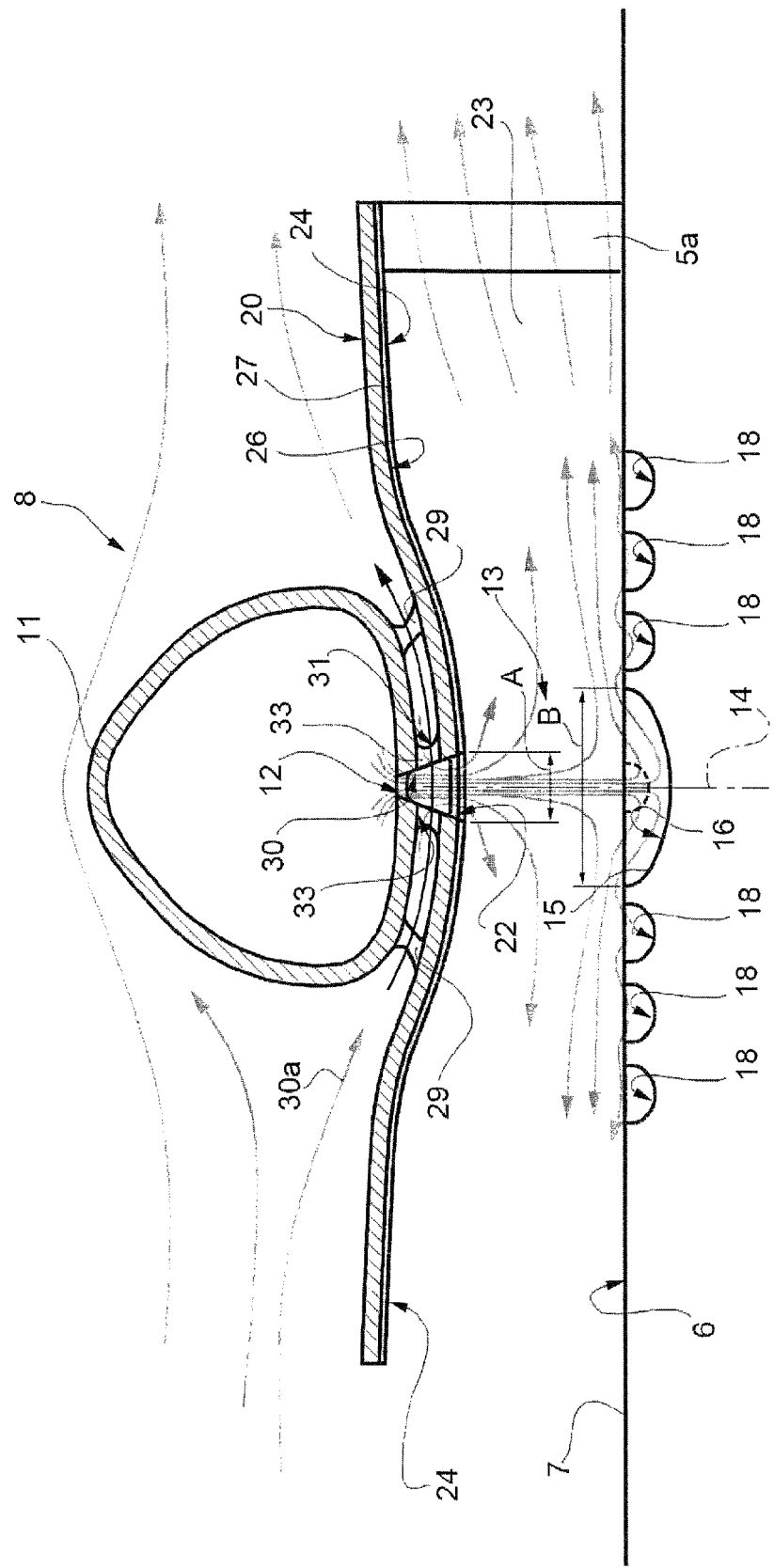
FIG. 3 shows, in section and on an enlarged scale, a detail of FIG. 1.

With reference to FIGS. 1 and 3, the stator body 2 comprises an outer casing 5 delimited by its outer lateral surface 6, having a straight longitudinal generatrix or composed of curved and/or straight sections. In the example shown, the generatrix of an intermediate portion of the surface 6 is indicated by reference numeral 7. The generatrix 7 is inclined with respect to the axis 4 (FIG. 1).

Figure 2:
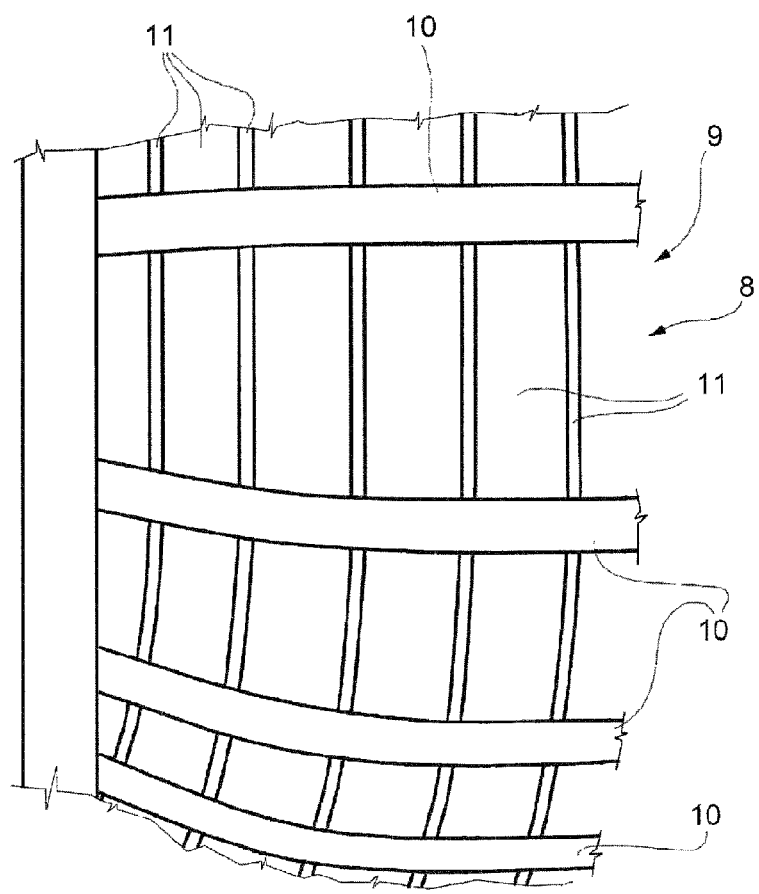
FIG. 2 is a partial perspective view of a cooling system of FIG. 1.

The outer casing 5 is cooled by an air cooling device 8, which, with reference to FIG. 2, comprises a cage 9 of tubes surrounding the outer casing 5. In turn, the cage 9 comprises a plurality of longitudinal air-supply tubes 10 and a plurality of inner circumferential tubes 11 for distributing the air on the outer lateral surface 6. The circumferential tubes 11 receive cooling air from the longitudinal tubes 10 and are provided with a plurality of outlet openings 12 or holes for air distribution along the inner periphery of the circumferential tubes 11; each opening 12 therefore faces the outer lateral surface 6 and enables the passage of a corresponding cooling airflow 13 having its axis 14 practically orthogonal to the generatrix 7 (FIG. 3).

The airflows 13 of each circumferential tube 11 impacts a respective portion 15 of the outer lateral surface 6; each portion 15 is concave with the concavity facing the respective opening 12 and partially delimits a continuous circumferential groove or channel 16 made in the outer lateral surface 6 and intersected by the airflows 13 in points of maximum depth of the channel 16.

In the particular example described, each channel 16 is symmetrical with respect to a radial plane containing the axes 14 of the above-mentioned airflows and passing through the respective points of maximum depth. According to a variant that is not shown, one or more channels 16 are asymmetric with respect to the above-mentioned radial plane.

Always with reference to FIG. 3, two groups of circumferential channels 18 are provided on the outer lateral surface 6 on opposite sides of the channel 16, these being mutually adjacent and parallel to the respective channel 16. Channels 18, which have respective passageway half-sections less than or equal to those of channel 16 and maximum depths less than or equal to that of channel 16, locally modify, together with channel 16, the outer lateral surface 6 around channel 16, making it a surface no longer smooth, but grooved or corrugated. As visible in the attached figures, and in FIG. 1 in particular, the circumferential tubes extend completely externally to the channels 16 and 18 and the generatrix 7 of the outer lateral surface 6.

Conveniently, the two groups of circumferential channels 18 are arranged symmetrically with respect to the above-mentioned radial plane that contains axes 14.

Still with reference to FIG. 3, the cooling device 8 further comprises, for each circumferential tube 11, an associated circumferential shielding and support wall 20 interposed between the respective circumferential tube 11 and the outer lateral surface 6. The circumferential wall 20 is firmly connected to the outer casing 5 by means of spacers 5a extending outwardly from the surface 6, is set apart from a wall 20 adjacent to it and is positioned at a distance from the outer lateral surface 6 greater than the distance of the same circumferential wall 20 from the respective circumferential tube 11.

Each wall 20 has respective radial openings 22 for the passage of airflows at each of the openings 12, and, with the outer lateral surface 6, delimits a longitudinal annular duct, indicated by reference numeral 23. The annular duct 23 has a tapered section at the openings 22 and respective circumferential channel 16 and two opposite longitudinal end sections 24 with a section that increases with the distance from the respective channels 18.

The inner surface 26 of the wall 20 facing the outer lateral surface 6 is, conveniently, covered in a layer 27 of thermally insulating material, which comprises at least one outer layer in a reflective material, for example aluminium, and defines a thermal barrier that obstructs the passage of heat towards the circumferential tubes 11.

Each circumferential tube 11 is connected to an outer lateral surface of the wall 20 by a plurality of spacer elements 29, which allow the passage of a cooling airflow 30a impacting the circumferential tubes 11 between the circumferential tubes 11 and the associated wall 20, as shown in FIG. 3, in this way increasing the effectiveness of the above-mentioned thermal barrier.

Always with reference to FIG. 3, the cooling device 8 further comprises, for each of the openings 12, a respective guide duct 30 for the corresponding cooling airflow 13; each duct 30 is defined by a conveniently circular tubular portion 31, which extends between the corresponding circumferential tube 11 and the circumferential wall 20 and has an end section defined by the corresponding opening 22.

Conveniently, each of the outlet openings 22 has a dimension or diameter A measured parallel to the generatrix 7 that is greater than the corresponding outlet 12 and is less than the width B of the respective circumferential channel 16 measured in the same direction.

According to one variant, the dimension A of all or some of the openings 22 is greater than the widths B and the widths of at least some of channels 18, as shown by a dashed line in FIG. 3. Conveniently, the dimension A of all or some of the openings 22 is also greater than the depth of at least some of channels 16 or channels 18.

According to a further variant, channels 18 have dimensions that are the same as or comparable to those of channels 16.

The above-described geometrical configurations enable changing the geometry of the outer lateral surface 6 and to consequently increase the effectiveness of the cooling.

Conveniently, each duct 30 is a duct diverging towards the channel 16 and the associated tubular portion 31 has lateral openings or passageways 33 flowing into the associated duct 30 for the input or intake of part of airflow 30a, which is sucked into the duct by airflow 13.

Preferably, the circumferential tubes 11, the associated walls 20, the respective spacers 29 and the respective tubular portions 31 are made of a polymeric material and, conveniently, formed by one or more portions made in one piece.

Figure 5:
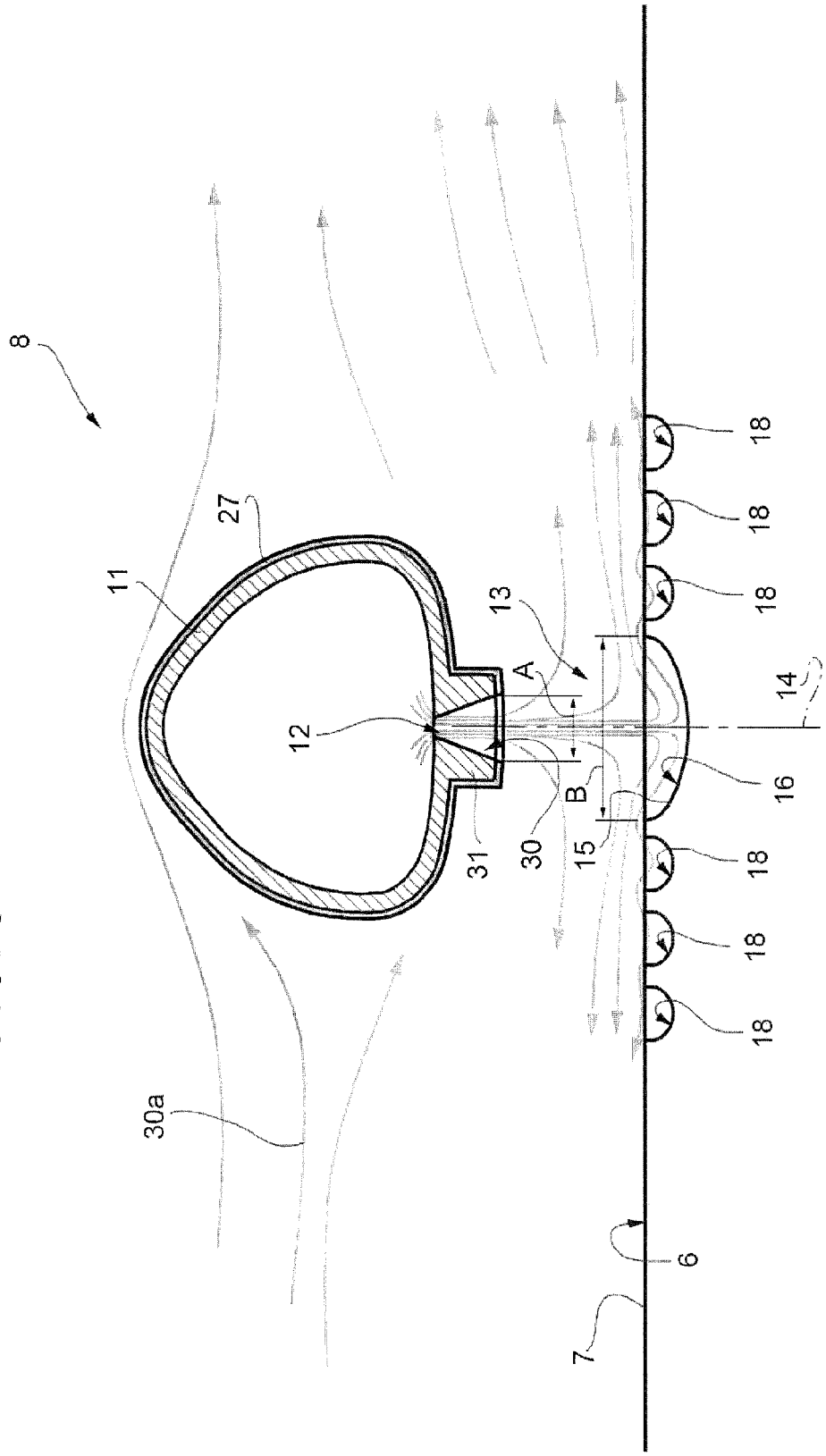
FIG. 5 is similar to FIG. 4 and shows a further variant of a detail of FIG. 1.

In the variant shown in FIG. 5, the cooling device 8 is devoid of wall 20 and the covering layer 27 only covers tubular portions 31 and the outer lateral surface of the circumferential tubes 11.

Figure 4:
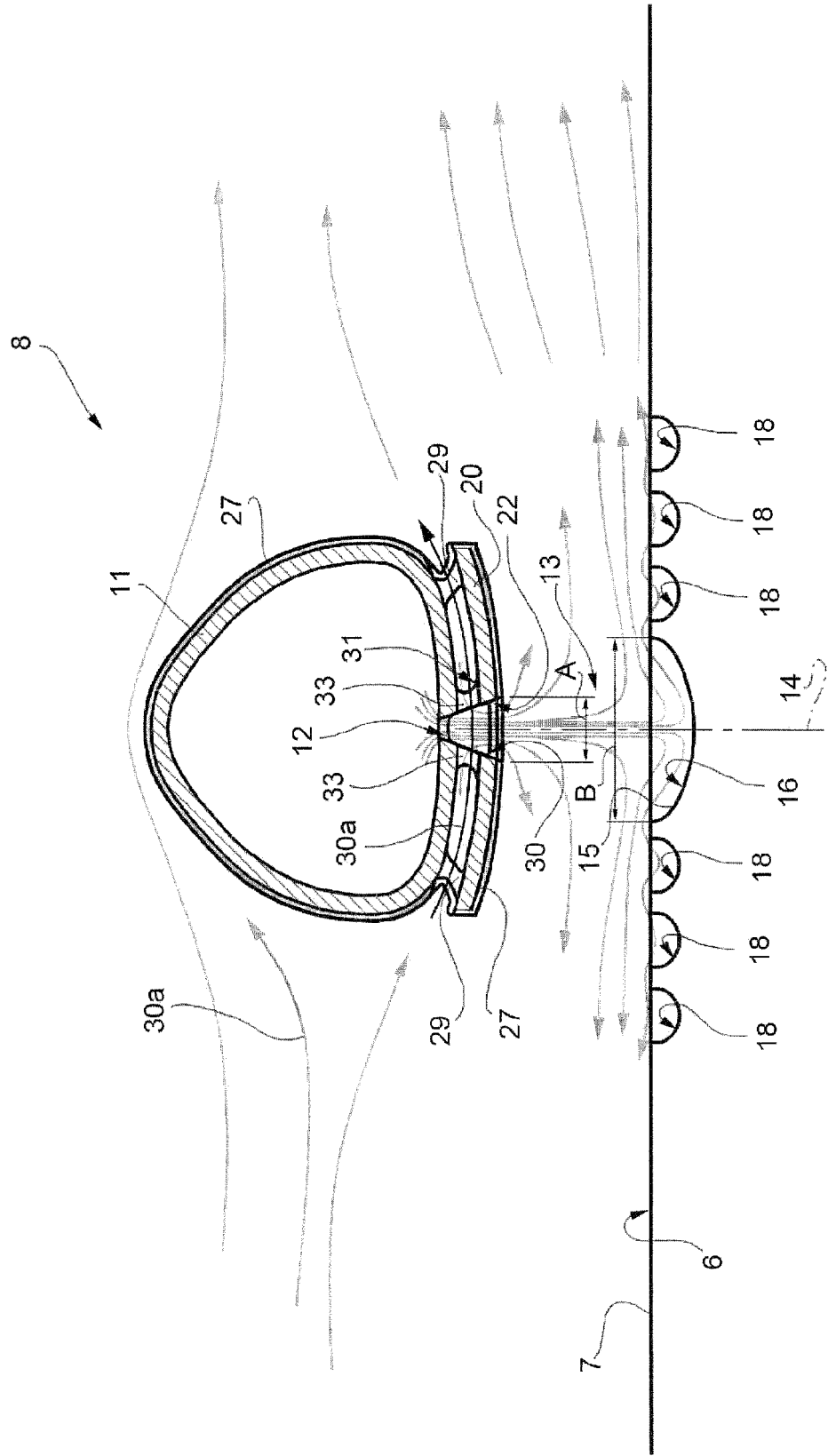
FIG. 4 is similar to FIG. 3 and shows a variant of a detail of FIG. 1.

According to a further variant shown in FIG. 4, the circumferential wall 20, conveniently with a substantially straight generatrix, extends exclusively beneath the associated circumferential tube 11, is always connected to the circumferential tube 11 by the spacers 29 with which it cooperates to form a support structure for the associated circumferential tube 11 and shielding for the same circumferential tube 11.

From the foregoing, it is evident that in the described turbine 1, the special cooling device enables significantly reducing the quantity of air used, whilst maintaining the cooling effectiveness of currently used systems unchanged for the same radiative loads emitted by the stator part.

The above is mainly due to the fact that the traditional smooth outer lateral surfaces of the stator part which are impacted by the jets of cooling air 13 are substituted by concave or grooved circumferential surfaces that enable a significant increase in heat dissipation. Experimentally, it has been possible to establish that heat dissipation is even more effective when lateral secondary channels (channels 18) are placed side by side with the main channel 16 impacted by the cooling airflows 13, these secondary channels having the same or different shapes and geometries from those of the main channel 16. The above is a consequence of the fact that these secondary channels act as turbulence promoters as well as increasing the heat exchange surface precisely in the zone where maximum relative velocity is measured for the mass of air impacting the outer lateral surface 6. The shape and dimensions of the half-sections of channels 16 and 18 vary in function of the characteristics of the airflows 13.

According to the invention, the airflows 13 are modelled by the tubular portions 31 that define, amongst other things, also veritable shields for the airflows 13. In fact, the shape of each of the cooling airflows 13 can be controlled by modifying the conical shape of the duct 30 and/or entraining part of the airflow impacting the circumferential tubes 13 through the lateral passageways 33.

The walls 20 cooperate to increase heat dispersion from the stator part by defining both a heat shield, as their coating obstructs the passage of heat towards the circumferential tubes 11, and a fluidic shield for the airflow 23, which thus moves within an annular duct and is therefore insensitive to disturbances generated by other external longitudinal airflows that collide with the circumferential tubes 11 and, for example, the airflows generated by the upstream cooling airflows 13.

Finally, the fact of locating the circumferential tubes 11 in a position relatively distant from the outer lateral surface 6 and, as stated, external to the generatrix 7 and channels 16 and 18, and the fact of obstructing the heat flow originating from the stator body and directed to the tubes 11 allows using materials other than the current steel-based materials and, in particular, the use of decidedly lighter materials, such as polymeric or composite materials, for producing both the tubes and the walls 20, as well as the entire heat shielding in general.

The use of polymeric or composite materials enables producing structural walls, monolithic or otherwise, with the function of supporting the circumferential tubes 11, and providing circumferential tubes of any geometry and/or size.

It is evident from the foregoing that modifications and variants can be made to the described device 8 without departing from the scope of protection defined in the independent claim.

Specifically, the wall 20 could have a different geometry from that indicated by way of example and, in particular, be a flat surface with or without flow guide ducts.

Finally, channels could be different in number, size and geometry from those indicated and/or ridges could be provided on the outer lateral surface 6 in a position adjacent to the channel 16 for the purpose of further increasing the surface over which the air flows and thus the exchange of heat.

The invention claimed is:

1. A gas turbine for aeronautic engines comprising a stator comprising:
an outer casing delimited by an outer lateral surface thereof having a longitudinal generatrix and air cooling means for said outer casing, said cooling means comprising a plurality of circumferential tubes for distributing cooling air on said outer lateral surface and arranged externally to the outer lateral surface itself; each circumferential tube being provided with a plurality of outlets of respective cooling airflows incident on corresponding portions of said outer lateral surface, each said surface portion being concave with the concavity facing the respective said outlet and partially delimiting a respective circumferential channel inside which said airflows impact; all said circumferential tubes being arranged completely outside of said outer lateral surface, and all said outlets are placed outside to the respective circumferential channels.

2. A turbine according to claim 1, wherein each said flow has its own axis orthogonal to said generatrix.

3. A turbine according to claim 1, wherein said cooling means further comprise two groups of further circumferential channels arranged on opposite longitudinal sides of said circumferential channel; said further circumferential channels having smaller or equal transversal passageway half-sections than those of the respective said circumferential channel.

4. A turbine according to claim 1, wherein said cooling means further comprise two groups of further circumferential channels arranged on opposite longitudinal sides of said circumferential channel; said further circumferential channels having less or equal depth than that of the respective said circumferential channel.

5. A turbine according to claim 1, wherein at least part of said circumferential channels have a depth less or equal than one dimension of said outlets measured parallel to said longitudinal generatrix.

6. A turbine according to claim 1, wherein at least part of said circumferential channels have a width less than one dimension of said outlets measured parallel to said longitudinal generatrix.

7. A turbine according to claim 1, wherein each said outlet and the corresponding said airflow extend along a respective axis intersecting the respective said circumferential channel at a point of maximum depth.

8. A turbine according to claim 1, wherein each said circumferential channel is symmetrical with respect to a radial plane orthogonal to the generatrix of said outer lateral surface and passing through the respective said points of maximum depth.

9. A turbine according to claim 1, wherein said cooling means further comprise a circumferential wall interposed between said outer lateral surface and each of said circumferential tubes; said circumferential wall having radial openings for the passage of said airflows and, with said outer lateral surface, delimiting a respective longitudinal annular duct.

10. A turbine according to claim 9, wherein said circumferential wall is placed at a distance from said outer lateral surface greater than the distance of the same circumferential wall from the respective said circumferential tube.

11. A turbine according to claim 9, wherein said longitudinal annular duct has a tapered section at said radial openings and at the respective said circumferential channel.

12. A turbine according to claim 11, further comprising spacing means interposed between said circumferential wall and the respective said circumferential tube; said spacing means allowing the passage of a cooling airflow incident on said circumferential tube between the circumferential tube and the associated said circumferential wall.

13. A turbine according to claim 9, wherein said cooling means further comprise a layer of thermally insulating material arranged on the surface of said circumferential walls facing said outer lateral surface.

14. A turbine according to any of claim 9, wherein said cooling means further comprise a reflective surface carried by said circumferential walls in a position facing said outer lateral surface.

15. A turbine according to claim 9, wherein said cooling means comprise, for each of said outlets, a respective tubular portion to guide the corresponding said airflow extending between the circumferential tube and the corresponding said circumferential wall.

16. A turbine according to claim 15, wherein said tubular portion delimits a guide duct flared towards said outer lateral surface.

17. A turbine according to claim 15, wherein each of said tubular portions is provided with lateral inlet openings in the respective said guide duct for a cooling air mass that is different from that fed by the respective said circumferential tube and is drawn into the corresponding said duct by the respective said airflow.

18. A turbine according to claim 1, wherein at least part of said openings obtained on said circumferential wall have a dimension measured parallel to a generatrix of said outer lateral surface that is less than the width, measured in the same direction, of said circumferential channel where said cooling airflows impact.

19. A turbine according to claim 1, wherein said cooling means comprise a thermal barrier covering at least part of the outer lateral surface of said circumferential distribution tubes.

20. A turbine according to claim 1, wherein said cooling means comprise, for each said outlet, a respective tubular body to guide the corresponding said airflow emitted from the respective said circumferential distribution tube towards said outer lateral surface.

21. A turbine according to claim 20 wherein said tubular body delimits a guide duct of the corresponding said flow diverging towards said outer lateral surface.

* * * * *